(12) United States Patent
Zook et al.

(10) Patent No.: US 12,722,769 B2
(45) Date of Patent: Sep. 1, 2026

(54) METHODS OF SHIMMING AN ASSEMBLY

(71) Applicant: 3M INNOVATIVE PROPERTIES COMPANY, St. Paul, MN (US)

(72) Inventors: Jonathan D. Zook, Stillwater, MN (US); Larry S. Hebert, Hudson, WI (US); Chris A. Praggastis, Renton, WA (US); Jacob P. Jones, St. Paul, MN (US); Susan E. DeMoss, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 746 days.

(21) Appl. No.: 17/628,958

(22) PCT Filed: Jul. 15, 2020

(86) PCT No.: PCT/IB2020/056655
§ 371 (c)(1),
(2) Date: Jan. 21, 2022

(87) PCT Pub. No.: WO2021/014277
PCT Pub. Date: Jan. 28, 2021

(65) Prior Publication Data

US 2022/0258848 A1 Aug. 18, 2022

Related U.S. Application Data

(60) Provisional application No. 62/878,507, filed on Jul. 25, 2019.

(51) Int. Cl.

| | |
|---|---|
| ***B64C 1/12*** | (2006.01) |
| ***B29C 65/78*** | (2006.01) |
| *B33Y 10/00* | (2015.01) |

(52) U.S. Cl.
CPC ........... *B64C 1/12* (2013.01); *B29C 65/7826* (2013.01); *B33Y 10/00* (2014.12)

(58) Field of Classification Search
CPC ....... B64C 1/12; B29C 65/7826; B29C 65/76; B29C 65/562; B29C 66/112;
(Continued)

(56) References Cited

U.S. PATENT DOCUMENTS

| | | |
|---|---|---|
| 4,366,307 A | 12/1982 | Singh |
| 4,609,762 A | 9/1986 | Morris |

(Continued)

FOREIGN PATENT DOCUMENTS

| | | |
|---|---|---|
| WO | WO 2013-151893 | 10/2013 |
| WO | WO 2014-164103 | 10/2014 |

(Continued)

OTHER PUBLICATIONS

"Analysis Methods and Applications of Polymer Materials", Wang Zhengxi, Liu Peihua, Pan Haiqin, Shanghai Science and Technology Press, 1st edition, Jan. 2009, pp. 322-323.

(Continued)

*Primary Examiner* — Moshe Wilensky
(74) *Attorney, Agent, or Firm* — Carlos M. Téllez Rodriguez; 3M Innovative Properties Co

(57) ABSTRACT

Methods for making structural shims (220) for the mating assembly of parts, such as for installation between a skin (212) and substructure (214) of an aircraft. The methods include the steps of disposing a hardenable composition (216) into a gap between the first (212) and second parts (214), hardening the hardenable composition to provide a shim pattern (218) that is dimensionally stable, and removing the shim pattern from the gap without damage. The shim pattern can be used to provide a digital model thereof, which can in turn be used to fabricate the structural shim (220).

10 Claims, 2 Drawing Sheets

(58) Field of Classification Search
CPC ... B29C 66/131; B29C 66/301; B29C 66/532; B29C 66/004; B29C 66/474; B29C 66/54; B33Y 10/00; B29L 2031/3076; B29L 2031/3085
See application file for complete search history.

(56) References Cited

U.S. PATENT DOCUMENTS

| | | | |
|---|---|---|---|
| 5,225,472 | A | 7/1993 | Cameron |
| 5,616,796 | A | 4/1997 | Pocius |
| 5,621,143 | A | 4/1997 | Pocius |
| 5,912,319 | A | 6/1999 | Zook |
| 5,959,071 | A | 9/1999 | DeMoss |
| 6,172,179 | B1 | 1/2001 | Zook |
| 6,252,023 | B1 | 6/2001 | Moren |
| 6,410,667 | B1 | 6/2002 | Moren |
| 6,486,090 | B1 | 11/2002 | Moren |
| 6,509,418 | B1 | 1/2003 | Zook |
| 8,813,382 | B1 | 8/2014 | Buttrick |
| 9,429,935 | B2 | 8/2016 | Boyl-Davis |
| 9,650,150 | B2 | 5/2017 | Zook |
| 10,139,808 | B2 | 11/2018 | Engelbart |
| 10,317,886 | B1 | 6/2019 | Arthur |
| 2014/0353305 | A1 | 12/2014 | Matsen et al. |
| 2017/0362434 | A1 | 12/2017 | Ye |
| 2018/0067476 | A1 | 3/2018 | Engelbart |
| 2019/0003504 | A1 | 1/2019 | Bradley et al. |
| 2019/0144610 | A1 | 5/2019 | Moser |
| 2019/0169356 | A1* | 6/2019 | Tun .................... C08G 59/4021 |
| 2020/0190251 | A1 | 6/2020 | Hayashi et al. |

FOREIGN PATENT DOCUMENTS

| | | |
|---|---|---|
| WO | WO 2014-164244 | 10/2014 |
| WO | WO 2014-172302 | 10/2014 |
| WO | WO 2014-172305 | 10/2014 |
| WO | WO 2016-106352 | 6/2016 |
| WO | WO 2016-106364 | 6/2016 |
| WO | WO 2016-130673 | 8/2016 |
| WO | WO 2016-176537 | 11/2016 |
| WO | WO 2016-176548 | 11/2016 |
| WO | WO 2017-015188 | 1/2017 |
| WO | WO 2018-227149 | 12/2018 |
| WO | WO 2019-064103 | 4/2019 |
| WO | WO 2019-239273 | 12/2019 |

OTHER PUBLICATIONS

International Search Report for PCT International Application No. PCT/IB2020/056655, mailed on Oct. 13, 2020, 5 pages.

* cited by examiner

METHODS OF SHIMMING AN ASSEMBLY

CROSS REFERENCE TO RELATED APPLICATIONS

This application is a national stage filing under 35 U.S.C. 371 of PCT/IB2020/056655, filed 15 Jul. 2020, which claims the benefit of U.S. Provisional Patent Application No. 62/878,507, filed 25 Jul. 2019, the disclosures of which are incorporated by reference in their entirety herein.

FIELD OF THE INVENTION

Provided are methods of making and using a shim to fill gaps in a joint between part surfaces. Such part surfaces can be, for example, surfaces of aircraft components.

BACKGROUND

A shim is a thin piece of material used to fill small gaps or spaces between parts to be joined together. Shims assume the shape of the gap and can support a compressive load to prevent undue distortion and damage to structural parts when fastened together. Shims are used in industrial applications, such as in automotive and aerospace manufacturing, as well as in residential and commercial construction.

In the aerospace field, the precision of shim dimensions is especially critical for proper assembly of parts and ensuring structural integrity of the aircraft. Mounting an aerodynamic surface or skin to the internal substructure requires fitting the parts together at mating surfaces without leaving any gaps between the mating surfaces greater than a predetermined allowance. Gaps greater than the predetermined allowance must be filled with a shim to provide a desirable aerodynamic performance and structural integrity.

Various types of shims are available. Solid shims may be made of the same material as the interfacing parts. Laminated peelable shims may be made of foil layers that can be removed one-by-one until a favorable fit is achieved. Liquid shim materials work well in filling irregular or tapered interfaces and are typically used to fill gaps less than 0.7 millimeters in width.

Determining the necessity, size, and shape of a given shim can be an iterative and labor-intensive process. Generally, parts are temporarily assembled and then visually inspected and measured for gaps between the skin and substructure. The parts may then be dismantled and a trial shim would be fabricated. The parts may then be reassembled with the shim temporarily secured in place, to check the fit. This is a second temporary assembly operation and such operations may need to be repeated until a proper fit is achieved.

SUMMARY

There is a need for methods and associated equipment to create a physical and/or computerized model of the gap so that an appropriate shim can be fabricated without the need for the costly and time-consuming iterative processes that impact production flow.

The present disclosure provides compositions and methods to create a physical model of the gap. The physical model, in turn, provides information that can then be used to fabricate shims with the appropriate size and shape. This invention also includes manufacture of the shim and installation of the shim into the gap in an aircraft structure.

In a first aspect, a method for making a structural shim for installation between a first part and second part of an assembly is provided. The method comprises: disposing a hardenable composition into a gap between the first and second parts; hardening the hardenable composition to provide a shim pattern that is dimensionally stable; removing the shim pattern from the gap, the shim pattern being capable of removal from the gap without damage; creating a digital model of the shim pattern; and using the digital model to fabricate the structural shim.

In a second aspect, a method for joining a skin and substructure of an aircraft is provided, the method comprising: making the structural shim according to the aforementioned method; inserting the structural shim between the skin and substructure; and fastening the skin and substructure to each other.

In a third aspect, a method for making a shim pattern for fabrication of a structural shim for installation between a skin and substructure of an aircraft is provided, the method comprising: disposing a hardenable composition into a gap between the skin and the substructure; hardening the hardenable composition to provide the shim pattern, wherein the shim pattern is dimensionally stable; and removing the shim pattern from the gap, the shim pattern being capable of removal from the gap without damage.

Figure 1:
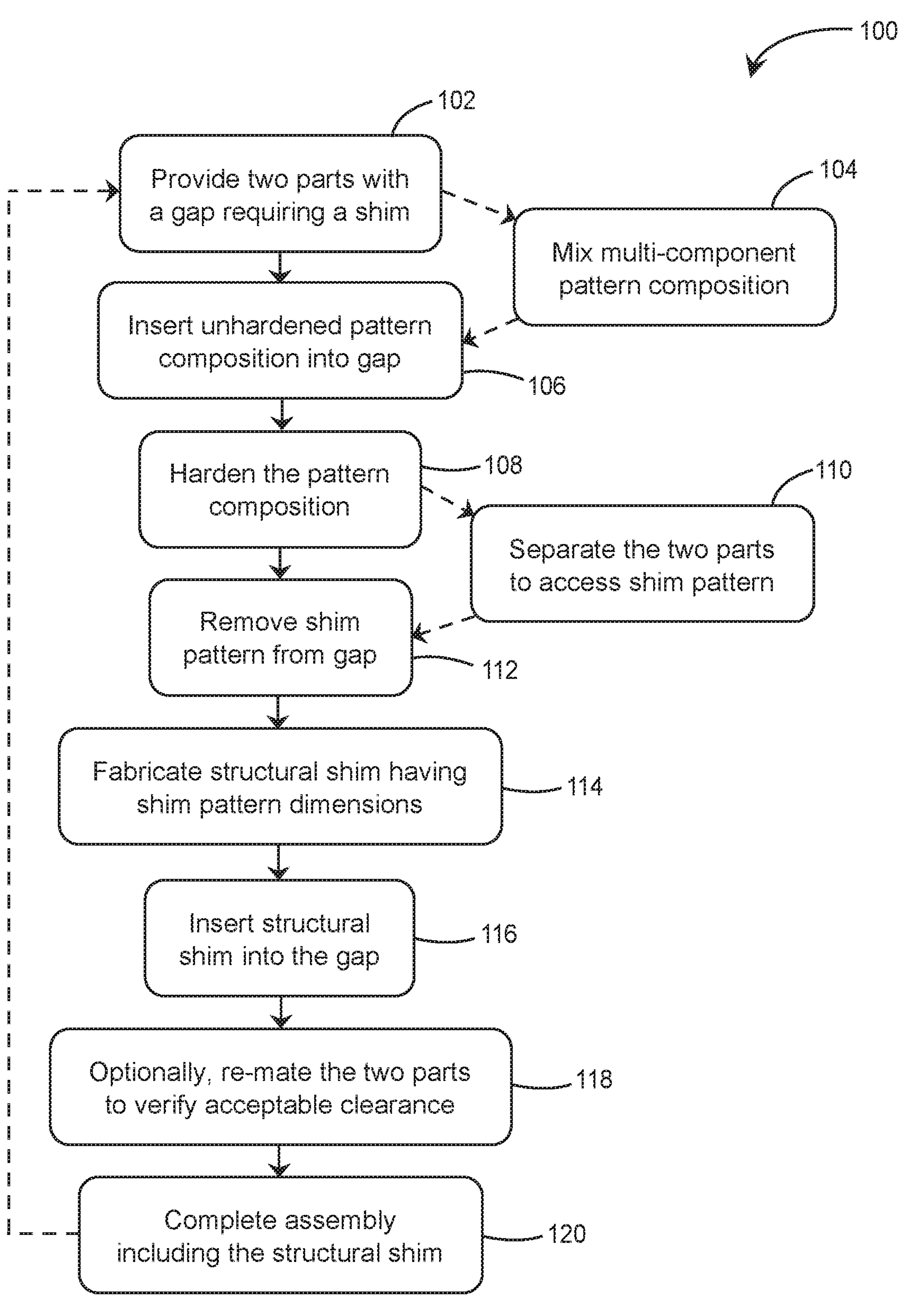
FIG. 1 is a block diagram showing exemplary methods of making and using a structural shim according to various embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

"Alkoxy" refers to an oxygen atom connected to an alkyl group, including a cycloalkyl group.

"Alkyl" refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms.

"Ambient temperature" means at 25 degrees Centigrade.

"Aryl" as used herein refers to cyclic aromatic hydrocarbon groups that do not contain heteroatoms in the ring.

"Cure" means to form a chemically-crosslinked polymer network.

"Cycloalkyl" refers to cyclic alkyl groups such as, but not limited to, cyclopropyl, cyclobutyl, cyclopentyl, cyclohexyl, cycloheptyl, and cyclooctyl groups.

"Organic group" refers to any carbon-containing functional group.

"Substantially" means a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

"Substituted" in conjunction with a molecule or an organic group as defined herein refers to the state in which one or more hydrogen atoms contained therein are replaced by one or more non-hydrogen atoms.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

In methods described herein, steps can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

It is noted that the term "comprises," and variations thereof, do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, and vertical may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

Provided herein are structural shims for assembly of parts. The assembled parts, in some instances, may be used in automotive, aerospace, marine, residential, architectural or other commercial or industrial applications.

In some embodiments, the shimmed parts are aircraft components. Aircraft components include the skin and substructure of the aircraft. Aircraft substructures are not particularly limited and can include, for example, stringers, spars, ribs, and other framing elements in the aircraft's wings and fuselage.

Structural shims are fly-away components of the aircraft and are made from stiff, load-bearing materials. These shims are used to fill gaps between assembled parts that would otherwise produce dimpling or buckling of the part, and associated stress concentrations. These stress concentrations, if severe, can cause fasteners to fail and ultimately cause significant damage to the aircraft. Therefore, it is desirable to make a customized shim that precisely fits the gap in which it is to be installed.

Methods of Making and Assembling a Shim

An exemplary method of using a customized, structural shim is shown in a process of assembly shown in the block diagram of FIG. 1, herein designated by the numeral 100.

In FIG. 1, block 102 represents an initial step of providing two parts to be assembled to each other. These parts are generally mating parts that have opposing surfaces separated from each other by one or more gaps. The provided structural shim has a precise size and shape such that the shim exactly fills the gap while preserving the separation and relative orientation of the opposing surfaces.

The gap has a particular three-dimensional shape defined by location and orientation of the opposing surfaces. The gap dimensions along and between the opposing surfaces need not be limited. It is very common for the gap to have a thickness (defined as the distance between the opposing part surfaces) that varies along the opposing surfaces.

In some embodiments, the gap is zero or essentially zero along at least some portion of the mating surfaces—i.e., the parts touch each other at these locations. Outside of these locations, the gap can have a maximum width that is from 500 micrometers to 6350 micrometers, from 500 micrometers to 4750 micrometers, from 500 micrometers to 3175 micrometers, or in some embodiments, less than, equal to, or greater than, 500 micrometers, 600, 700, 800, 900, 1000, 1100, 1200, 1500, 1700, 2000, 2200, 2500, 2700, 3000, 3175, 3500, 3750, 4000, 4250, 4500, 4750, 5000, 5500, 6000, 6150, 6350, or 6500 micrometers, as measured along a direction perpendicular to one or both of the opposing part surfaces.

In block 106, an unhardened pattern composition is disposed into the gap between the opposing part surfaces. The unhardened pattern composition is, in some embodiments, a curable composition that can be shaped in the uncured state and capable of being subsequently cured to form a hardened pattern composition. Alternatively, the unhardened pattern composition may be a molten composition that is disposed into the gap at elevated temperatures and hardens upon cooling.

Optionally, and as shown in intervening block 104, the unhardened pattern composition is a mixture of two or more components capable of reacting with each other to form a hardened composition.

In block 108, the unhardened pattern composition is hardened to provide a shim pattern. The shim pattern is preferably dimensionally stable—i.e., it does not permanently flow, swell, shrink, or change shape under gravitation forces or as a result of ordinary storage and handling.

Hardening can take place using any known method. Known methods include hardening by cooling the unhardened pattern composition or curing the unhardened pattern composition through a chemical reaction at ambient temperature, heating to a curing temperature above ambient temperature, exposure to actinic radiation, or exposure to moisture.

The temperature at which curing takes place is generally a function of curing agent(s) used in the unhardened composition, and can be from −6 Centigrade to 350 Centigrade, from 0 Centigrade to 250 Centigrade, from 25 Centigrade to 100 Centigrade, or in some embodiments, less than, equal to, or greater than −10 Centigrade, −6, 0, 5, 10, 15, 20, 25, 30, 35, 40, 45, 50, 60, 70, 80, 90, 100, 125, 150, 175, 200, 250, 300, or 350 Centigrade.

Combinations of curing mechanisms thereof are also possible; for example, a "dual-cure" composition may be exposed to ultraviolet (UV) light to provide some degree of curing immediately, while a chemical curing process takes place simultaneously over a longer timeframe. Examples of dual-cure compositions and use thereof are described elsewhere, for example in US20170362434 (Ye et. al.), US20190144610 (Moser et. al.) and WO2018227149 (Liu et. al.).

In block 112, the now-hardened shim pattern is removed from the gap. Optionally, and as shown in block 110, removal of the shim pattern may be facilitated by moving the two parts away from each other. Alternatively, the shim pattern can be sufficiently flexible to allow its removal without separating or otherwise moving the two parts relative to each other. In either case, it is preferable for the shim pattern to be removed from the gap without damage to either the part surfaces or the shim pattern itself.

Preferably, the shim pattern is non-adhesive and detaches cleanly from the part surfaces defining the gap. To achieve clean removal, there should be essentially zero residual contamination on the mating part surfaces. Minimizing or eliminating residue is advantageous, because leaving behind even trace amounts of silicone compounds or other release agents or contaminants can adversely affect subsequent adhesion to the part surfaces.

In block 114, a structural shim is then fabricated based on the dimensions of the shim pattern removed from the gap. The structural shim can be manufactured using any of a variety of known manual and computer-assisted manufacturing methods.

A manual manufacturing method could be, for example, forming a mold with a negative impression of the shim pattern in a refractory material, and then introducing a molten metal into the mold to cast the structural shim.

Digital manufacturing methods are also possible. In one method, a three-dimensional (3D) digital model of the shim pattern is made by scanning the shim pattern with a suitable scanner. Useful scanners can use X-ray, laser, computed tomography (CT), and magnetic resonance imaging to capture the size and shape of the shim pattern. Alternatively, this information can be obtained using a contact probe that traces along the surface of the shim pattern. Any of these methods are capable of producing a digital data file representing the dimensions of the shim pattern.

Optionally, the raw digital model may be digitally cleansed by removing any data points deemed to be erroneous or unnecessary. For example, data representing portions of the shim pattern extruded beyond the gap region can be excluded, if desired. In addition, data points that are missing could be estimated and added in software to create smoothly contoured surfaces based on surrounding data points. To create 3D surfaces, the digital data may be converted from digital point clouds to a triangular mesh surface by means of software by a provider such as Geomagic, Inc. (Triangle Park, NC).

With the digital model of the shim pattern obtained, additive manufacturing or subtractive manufacturing techniques can be used to create the structural shim. Examples of additive manufacturing methods include, but are not limited to, 3D printing, selective area laser deposition or selective laser sintering (SLS), electrophoretic deposition, robocasting, fused deposition modeling (FMD), laminated object manufacturing (LOM), stereolithography (SLA) and photostereolithography. Subtractive manufacturing methods include use of a computer numerical control (CNC) milling machine to fabricate the structural shim. Preferably, the structural shim is made from a rigid material that does not significantly deform in response to compressive loads that would be encountered by the shim during and after installation.

In block 116, the structural shim is placed into the gap and then, in block 118, the two parts are mated with each other to verify that the shim adequately fills that gap. Preferably, any gaps that remain along the mating surfaces should be reduced to less than 500 micrometers, less than 250 micrometers, less than 100 micrometers, or in some embodiments, less than, equal to, or greater than 5 micrometers, 10, 15, 20, 25, 30, 35, 40, 45, 50, 60, 70, 80, 90, 100, 150, 200, 250, 300, 350, 400, 450, or 500 micrometers.

Finally, block 120 represents the step of completing the assembly by fastening the mating parts to each other with the structural shim disposed between them. In aircraft manufacture, this may be carried out using one or more mechanical fasteners.

Figure 2:
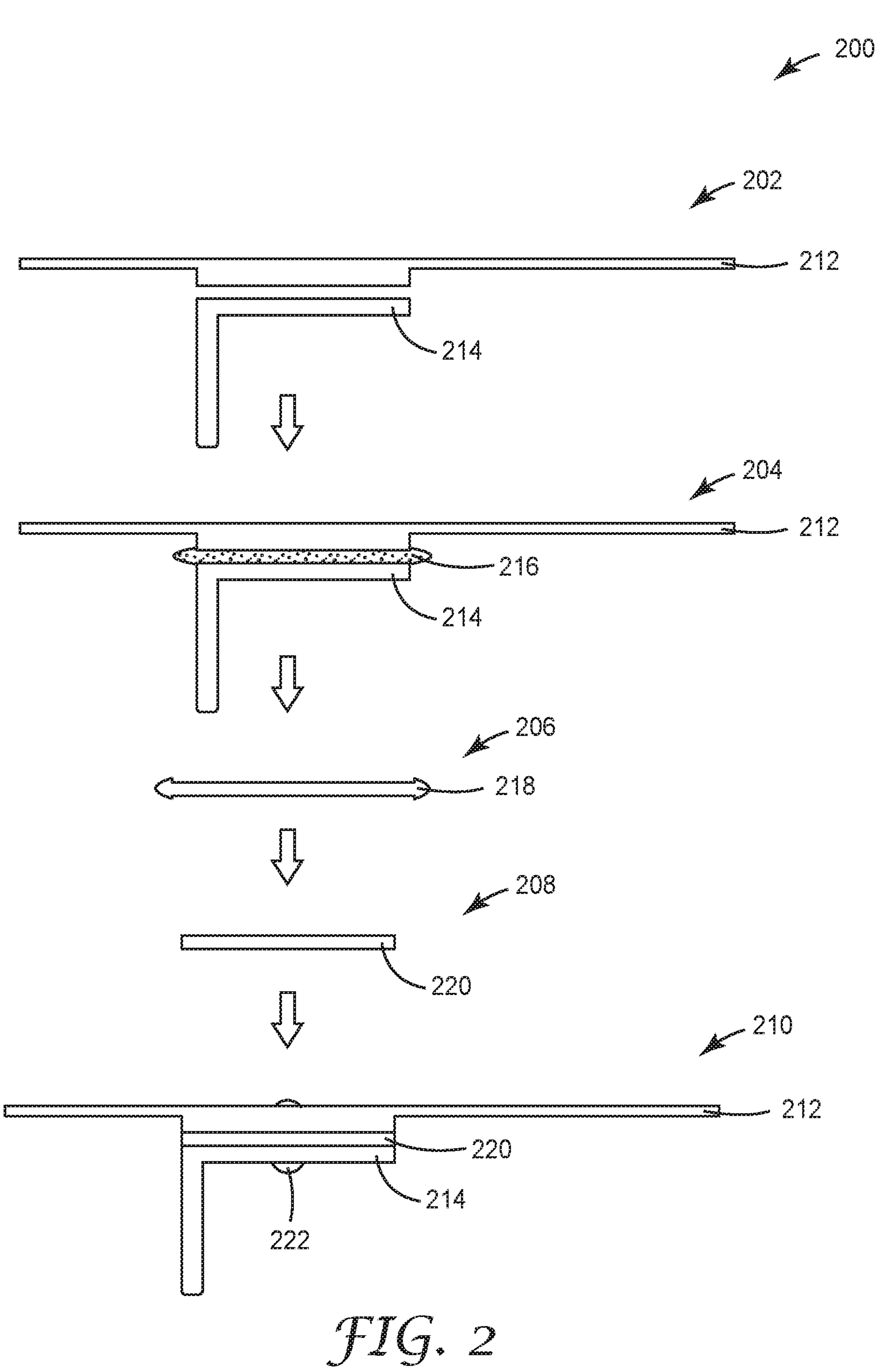
FIG. 2 is a schematic illustrating a method described in the block diagram of FIG. 1.

FIG. 2 shows a sequence of steps according to the process 100 as applied to an aircraft assembly. In this application, the first part is a skin 212 of the aircraft and the second part is a substructure 214 of the aircraft.

In step 202, the skin 212 is shown positioned next to the substructure 214. Here, the substructure 214 is an aircraft stringer having a generally "L"-shaped cross-section. As shown in step 204, a curable composition 216 is disposed between the skin 212 and substructure 214, and the latter two structures brought into mating relation. The curable composition 216 is then cured and then removed, as shown in step 206, to produce hardened shim pattern 218.

With the assistance of a computer, the shim pattern 218 is then scanned to provide a 3D digital model, which is then used to mill a structural shim 220, as provided in step 208. To provide a high degree of strength, the structural shim 220 can made from metal, commonly steel or aluminum. Finally, in step 210, the skin 212, structural shim 220, and substructure 214 are secured to each other by a rivet 222 passing through all three components. It is to be understood that other fasteners or fastening mechanisms may also be used.

While not shown in FIGS. 1-2, it is possible for the shim pattern 218 itself to be used as a structural shim in certain applications. While this might not be practical for some of the hardenable/hardened pattern compositions described herein, it might be possible if the shim pattern made from a sufficiently strong and incompressible material. In this alternative workflow, the process is greatly simplified since there is no need for additional steps to fabricate the structural shim.

Shim Pattern Compositions

The shim pattern can be made from any of a number of suitable hardenable pattern compositions. Hardenable pattern compositions include compositions that are flowable liquids or malleable solids at ambient temperature. This enables the compositions to be shaped at the time they are disposed into the gap. If desired, hardenable pattern compositions can become extrudable to allow them to be dispensed through a nozzle. Dispensers are well known in the art and include, for example, positive-displacement pumps and syringes. When hardened, these compositions become dimensionally-stable.

A dimensionally-stable composition has a size and shape that is generally fixed at a given temperature, such as ambient temperature. It is noteworthy that a dimensionally-stable composition may be rigid but is not necessarily so. For example, the shim pattern can be a hardened rubber that is capable of being stretched or flexed but reverts back to its original shape when relaxed.

In some embodiments, the hardenable pattern composition is dimensionally-stable at ambient temperature and thus needs to be heated during use. For instance, the hardenable pattern composition can be provided in the form of a solid polymeric film or sheet and then heated at, or prior to, the time it is placed between the mating surfaces of the parts.

The composition can then be hardened by cooling it back down to ambient temperature to obtain the shim pattern.

In preferred embodiments, hardenable pattern compositions harden through a chemical reaction. These include compositions that are thermally-curable, radiation-curable, chemically-curable, or a combination thereof. The term "thermally-curable" refers to compositions that can be cured by applying heat to the composition. The term "radiation-curable" refers to compositions that can be cured upon exposure to electromagnetic radiation. The term "chemically-curable" refers to compositions that can be cured upon contact with a catalyst.

Useful shim pattern compositions in the provided methods of assembly are non-adhesive when hardened. This property enables the newly formed shim pattern to be cleanly removed from the mating surfaces of the adjacent parts. Especially useful curable compositions for this purpose include a polythiol, such as a polythioether or a polysulfide. Polythioethers include thioether linkages (i.e., —S—) in their backbone structures. Polysulfides include disulfide linkages (i.e., —S—S—) in their backbone structures.

In some embodiments, the curable composition can be a two-component composition that can be cured by mixing a first component and a second component with each other. For example, the first component can include a polythiol and the second component can include an oxidizing agent, unsaturated compound having at least two non-aromatic carbon-carbon double bonds, at least one carbon-carbon triple bond, or a combination thereof. Either the first or second component can further include an organoborane-amine complex, an organic or inorganic peroxide, a photoinitiator system, or some combination thereof.

Useful polythiols are organic compounds having at least two (e.g., at least 2, at least 3, at least 4, or even at least 6) thiol groups. To achieve chemical crosslinking between polymer chains in the curable composition, at least one of the polythiol(s) in the first component and/or at least one of the unsaturated compounds in the second component can have an average functionality of at least two.

The polythiol can be an alkylene, arylene, alkylarylene, arylalkylene, or alkylenearylalkylene having at least two mercaptan groups, where any of the alkylene, alkylarylene, arylalkylene, or alkylenearylalkylene are optionally interrupted by one or more oxa (i.e., 0), thia (i.e., S), or imino groups (i.e., $NR^3$ wherein $R^3$ is a hydrocarbyl group or H), and optionally substituted by alkoxy or hydroxyl.

Useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethyl sulfide, methyl-substituted dimercaptodiethyl sulfide, dimethyl-substituted dimercaptodiethyl sulfide, dimercaptodioxaoctane, 1,5-dimercapto-3-oxapentane, benzene-1,2-dithiol, benzene-1,3-dithiol, benzene-1,4-dithiol, and tolylene-2,4-dithiol. Examples of polythiols having more than two mercaptan groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Also useful are polythiols formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively.

Suitable polythiols also include those commercially available as THIOCURE PETMP (pentaerythritol tetra(3-mercaptopropionate)), TMPMP (trimethylolpropane tri(3-mercaptopropionate)), ETTMP (ethoxylated trimethylolpropane tri(3-mercaptopropionate) such as ETTMP 1300 and ETTMP 700), GDMP glycol di(3-mercaptopropionate), TMPMA (trimethylolpropane tri(mercaptoacetate)), TEMPIC (tris[2-(3-mercaptopropionyloxy)ethyl] isocyanurate), and PPGMP (propylene glycol 3-mercaptopropionate) from Bruno Bock Chemische Fabrik GmbH & Co. KG. A specific example of a polymeric polythiol is polypropylene-ether glycol bis(β-mercaptopropionate), which is prepared from polypropylene-ether glycol (e.g., PLURACOL P201, Wyandotte Chemical Corp.) and β-mercaptopropionic acid by esterification.

Polythioethers useful for practicing the present disclosure are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.).

Polythioethers can be prepared, for example, by reacting dithiols with dienes, diynes, divinyl ethers, diallyl ethers, ene-ynes, alkynes, or combinations of these under free-radical conditions. Examples of oligomeric or polymeric polythioethers useful for practicing the present disclosure are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.).

Polythioethers can also be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)).

Useful polythiols can be formed from the addition of hydrogen sulfide ($H_2S$) across carbon-carbon double bonds. For example, dipentene and triglycerides which can be reacted with $H_2S$. Specific examples include dipentene dimercaptan and polythiols available as POLYMERCAPTAN 358 (mercaptanized soybean oil) and POLYMERCAPTAN 805C (mercaptanized castor oil) from Chevron Phillips Chemical Co. LLP.

Useful polythiols of this type also include those derived from the reaction of $H_2S$ (or its equivalent) with the glycidyl ethers of bisphenol A epoxy resins, bisphenol F epoxy resins, and novolac epoxy resins. A preferred polythiol of this type is QX11, derived from bisphenol A epoxy resin, from Japan Epoxy Resins (JER) under the trade designation EPOMATE.

The amount of polythiol resin present in the curable composition can be from 5 percent to 90 percent, from 10 percent to 80 percent, from 20 percent to 80 percent, or in some embodiments, less than, equal to, or greater than 5 percent, 10, 15, 20, 25, 30, 35, 40, 45, 50, 55, 60, 65, 70, 75, 80, 85 or 90 percent by weight relative to the overall weight of the curable composition.

Oxidizing agents for polysulfide resins include metal oxides such as the oxides of lead, manganese, calcium, barium, sodium, and zinc. Of these, manganese (IV) oxide is particularly preferred, as it provides compositions having a unique blend of hardening efficiency, fast cure through with a desirable open time, and products exhibiting excellent UV and weathering properties, chemical resistance and adhesion to a wide variety of substrates. Other oxidizing agents can include metal salts such as chlorates, dichromates, and permanganates of the metals above. Useful oxidizing agents cure a polysulfide resin by producing disulfide linkages.

The amount of oxidizing agent, such as manganese (IV) oxide, in the curable composition can be from 1 percent to 25 percent, from 2 percent to 20 percent, from 3 percent to 15 percent, or in some embodiments, less than, equal to, or greater than 1 percent, 2, 2.5, 3, 4, 5, 6, 7, 7.5, 8, 9, 10, 11, 12, 13, 14, 15, 16, 17, 18, 19, 20, 21, 22, 23, 24, or 25 percent by weight relative to the overall weight of the curable composition.

Unsaturated compounds can include at least one unsaturated compound having at least two non-aromatic carbon-carbon double bonds, at least one carbon-carbon triple bond, or a combination thereof. In some embodiments, the non-aromatic carbon-carbon double bonds correspond to vinyl groups.

The organoborane-amine complex can be a latent form of an organoborane that is liberated upon decomplexing a base with a compound that reacts with the base, such as an acid or its equivalent. The free organoborane is an initiator capable of initiating free-radical polymerization of curable composition, for example.

In some embodiments, the organoborane-amine complex does not include a thiol group. Suitable organoboranes of the organoborane-amine complexes are trimethylborane, triethylborane, tri-n-propylborane, triisopropylborane, tri-n-butylborane, triisobutylborane, and tri-sec-butylborane.

Useful basic complexing agents include, for example, amines, aminoalcohols, aminoethers and compounds that contain a combination of such functionality (e.g., an amino group and an alkoxy group). Sufficient complexing agent is provided to ensure stability of the organoborane-amine complex under ambient conditions. The amount of excess basic complexing agent can be chosen to provide stability of the complex under ambient conditions while still achieving desired performance such as cure rate of the polymerizable composition and mechanical properties of the cured composition.

The organoborane-amine complex may be readily prepared using known techniques, as described, for example, in U.S. Pat. No. 5,616,796 (Pocius et al.), U.S. Pat. No. 5,621,143 (Pocius), U.S. Pat. No. 6,252,023 (Moren), U.S. Pat. No. 6,410,667 (Moren), and U.S. Pat. No. 6,486,090 (Moren).

Suitable organoborane-amine complexes are available from suppliers such as BASF and AkzoNobel. TEB-DAP (triethylborane-1,3-diaminopropane (or 1,3-propanediamine) complex), TnBB-MOPA (tri-n-butylborane-3-methoxypropylamine complex), TEB-DETA (triethylborane-diethylenetriamine complex), TnBB-DAP (tri-n-butylborane-1,3-diaminopropane complex), and TsBB-DAP (tri-sec-butylborane-1,3-diaminopropane complex) are all available from BASF (Ludwigshafen, Germany). TEB-HMDA (triethylborane-hexamethylenediamine (also 1,6-hexanediamine or 1,6-diaminohexane) complex) is available from AkzoNobel, Amsterdam, The Netherlands.

The organoborane-amine complex is generally employed in an effective amount, which is an amount large enough to permit reaction (i.e., curing by polymerizing and/or crosslinking) to readily occur to obtain a polymer of sufficiently high molecular weight for the desired end use. If the amount of organoborane produced is too low, then the reaction may be incomplete. On the other hand, if the amount is too high, then the reaction may proceed too rapidly to allow for effective mixing and use of the resulting composition.

An effective amount of the organoborane-amine complex is at least 0.1 percent by weight, or at least 0.5 percent by weight. An effective amount of the organoborane-amine complex is up to 10 percent by weight, or up to 5 percent by weight, or up to 3 percent by weight. The percent by weight of boron in a composition is based on the total weight of the polymerizable material.

A decomplexing agent may be included to activate the organoborane-amine complex. As used herein, the term "decomplexing agent" refers to a compound capable of liberating the organoborane from its complexing agent, thereby enabling initiation of the reaction (curing by polymerizing and/or crosslinking) of the polymerizable material of the composition. Decomplexing agents may also be referred to as "activators" or "liberators" and these terms may be used synonymously herein.

Compounds that react quickly with the base or the organoborane-amine complex under mild temperatures are particularly effective decomplexing agents. These may include mineral acids, Lewis acids, carboxylic acids, acid anhydrides, acid chlorides, sulfonyl chlorides, phosphonic acids, isocyanates, aldehydes, 1,3-dicarbonyl compounds, acrylates, and epoxies.

Suitable decomplexing agents may include amine-reactive compounds. The amine-reactive compound liberates organoborane by reacting with the amine, thereby removing the organoborane from chemical attachment with the amine. These compounds can readily form reaction products with amines at or below room temperature so as to provide a composition such as an adhesive that can be easily used and cured under ambient conditions.

If present, the decomplexing agent is typically used in an effective amount (i.e., an amount effective to promote curing by liberating the initiator from its complexing agent, but without materially adversely affecting desired properties of the ultimate composition). The decomplexing agent is typically provided in an amount such that the molar ratio of amine-reactive groups in the decomplexing agent(s) to amino groups in the complexing agent(s) is in the range of 0.5:1.0 to 10.0:1.0, preferably in the range of 0.5:1.0 to 4.0:1.0, and more preferably 1.0:1.0, although this is not a requirement.

Organic and inorganic peroxides can be added in any amount suitable to initiate curing. Useful organic peroxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy) cyclohexane, 1,1-di(tert-butylperoxy)-3,3,5-trimethylcyclohexane, and cyclohexanone peroxide), and diacylperoxides (e.g., benzoyl peroxide or lauryl peroxide). Useful inorganic peroxides include calcium peroxide and zinc peroxide.

In some embodiments, the organic peroxide is present in an amount of from 0.05 percent by weight to about 10 percent by weight (in some embodiments, 0.1 percent by weight to 5 percent by weight, or 0.5 percent by weight to 5 percent by weight). The organic peroxide and its amount may be selected to provide the composition with a desirable second time period (that is, the length of time a portion of curable composition adjacent the surface of the aircraft remains liquid) after it is mixed or thawed. In some embodiments, the composition has an open time of at least 10 minutes, at least 30 minutes, at least one hour, or at least two hours.

Certain photoinitiator systems generate free radicals upon exposure to actinic radiation to cure the curable composition. The photoinitiator system may include Type-I and/or Type-II photoinitiators, sensitizing dyes, amine synergists, and optionally electron donors (e.g., as in the case of 3-component electron-transfer photoinitiators), for example. The actinic radiation can be in the visible spectrum or in the ultra violet or infrared wavelength range and can be provided by any suitable source of electromagnetic radiation such as a light emitting diode (LED), mercury lamp, or halogen lamp.

The photoinitiator system can comprise a free-radical photoinitiator that is sensitive to wavelengths in the visible region of the electromagnetic spectrum. Examples of such photoinitiators include acylphosphine oxide derivatives, acylphosphinate derivatives, and acylphosphine derivatives (e.g., phenylbis(2,4,6-trimethylbenzoyl) phosphine oxide (available as OMNIRAD 819 from IGM Resins, St. Charles, Illinois), phenylbis(2,4,6-trimethylbenzoyl)phosphine (e.g., as available as OMNIRAD 2100 from IGM Resins), bis(2,4,6-trimethylbenzoyl)phenylphosphine oxide, 2,4,6-trimethylbenzoyldiphenylphosphine oxide (e.g., as available as OMNIRAD 8953X from IGM Resins), isopropoxyphenyl-2,4,6-trimethylbenzoylphosphine oxide, dimethyl pivaloylphosphonate), ethyl (2,4,6-trimethylbenzoyl) phenyl phosphinate (e.g., as available as OMNIRAD TPO-L from IGM Resins); and, bis(cyclopentadienyl) bis[2,6-difluoro-3-(1-pyrryl)phenyl] titanium (e.g., as available as OMNIRAD 784 from IGM Resins).

Optionally, the curable composition includes one or more basic compounds. These include amines such as 1,4-diazobicyclo[2.2.2]octane (DABCO), 1,2-dimethylimidazole, 3-quinuclidinol, and/or excess amine supplied with the organoborane-amine complex, and/or inorganic bases (e.g., magnesium hydroxide, sodium hydroxide, calcium hydroxide, calcium oxide, and sodium carbonate). If included, typical amounts are 0.1 to 8 percent by weight, preferably 0.2 to 2 percent, although this is not a requirement.

Examples of suitable curable compositions can be found in published PCT applications WO2013/151893 (Ye), WO2014/164103 (Ye), WO2014/164244 (Ye), WO2014/172302 (Zook), WO2014/172305 (Zook), WO2016/106352 (Ye), WO2016/106364 (Swan), WO2016/130673 (Demoss), WO2016/176537 (Zook), WO2016/176548 (Ye), and WO2017/015188 (Blackwell) as well as U.S. Pat. No. 9,650,150 (Zook) as well as U.S. Patent Application 62/66,709 (Moser).

Advantageously, it is possible for the curable composition to be embedded with light-transmitting films, fibers, and/or particles that can assist in transmitting actinic radiation through the curable composition. In some embodiments, for example, the curable composition includes a plurality of microspheres. The microspheres, which may be solid or hollow, resist compression and can set a maximum compression level for the curable composition. The microspheres can be made of glass. Glass microspheres can also be useful to help transfer actinic radiation such as blue light through curable composition. This can help to facilitate curing at locations in curable composition that are blocked by a non-transparent substance (e.g., an aircraft part as described herein) or to help facilitate curing at locations that are too deep in curable composition for the actinic radiation to penetrate.

Other materials such as hollow filaments or a woven hollow filament fiber fabric can be included in curable composition to help transfer actinic radiation through the curable composition. Any of the glass microspheres of filaments can extend from an external edge or surface of curable composition to any desired depth of curable composition.

Microspheres can also be used to modify the viscosity of curable composition. Any other suitable viscosity modifier can be used as well. A viscosity of the curable composition can be any suitable value. For example, the viscosity can be at a value where curable composition can flow and be deformed in an uncured state and substantially retain its form when at least partially cured. As an example, at ambient conditions (e.g., a temperature of about 25° C.) the viscosity of curable composition is in a range of from about 3,000 Pa·s to about 10,000 Pa·s, about 5,000 Pa·s to about 8,000 Pa·s, or less than, equal to, or greater than about 3,000 Pa·s, 3,500; 4,000; 4,500; 5,000; 5,500; 6,000; 6,500; 7,000; 7,500; 8,000; 8,500; 9,000; 9,500; or about 10,000 Pa·s. The viscosity can be measured using a HAAKE RheoWin machine although other machines are equally well suited for measuring viscosity.

A shim pattern described herein can have any suitable dimensions. For example, the width and length of a shim pattern can be independently chosen from about 1.2 cm to about 40 cm, about 5 cm to about 20 cm, about 10 cm to about 15 cm, or less than, equal to, or greater than about 1.2 cm, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, and about 40 cm. The thickness of shim can have any of the dimensions previously enumerated for the gap thickness.

Curable compositions can include one or more additional heterogeneous fillers. Such fillers include glass fibers, aluminum silicate (mullite), synthetic calcium silicate, zirconium silicate, fused silica, crystalline silica graphite, natural silica sand; boron powders such as boron-nitride powder, boron-silicate powders; oxides such as $TiO_2$, aluminum oxide, magnesium oxide, zinc oxide; calcium sulfate (as its anhydride, dehydrate or trihydrate); calcium carbonates such as chalk, limestone, marble, synthetic precipitated calcium carbonates; talc, including fibrous, modular, needle shaped, lamellar talc; wollastonite; surface-treated wollastonite; glass spheres such as hollow and solid glass spheres, silicate spheres, cenospheres, aluminosilicate (armospheres); kaolin, including hard kaolin, soft kaolin, calcined kaolin; single crystal fibers or "whiskers" such as silicon carbide, alumina, boron carbide, iron, nickel, copper; fibers (including continuous and chopped fibers) such as asbestos, carbon fibers; sulfides such as molybdenum sulfide, zinc sulfide; barium compounds such as barium titanate, barium ferrite, barium sulfate, heavy spar; metals (e.g., metal mesh, metal plate) and metal oxides such as particulate or fibrous aluminum, bronze, zinc, copper and nickel; flaked fillers such as glass flakes, flaked silicon carbide, aluminum diboride, aluminum flakes, steel flakes; fibrous fillers, for example short inorganic fibers such as those derived from blends including at least one of aluminum silicates, aluminum oxides, magnesium oxides, and calcium sulfate hemihydrate; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks; organic fillers such as polytetrafluoroethylene, reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol); as well as fillers such as mica, clay, feldspar, flue dust, fillite, quartz, quartzite, perlite, diatomaceous earth, carbon black, or combinations including at least one of the foregoing fillers. The filler can be surface treated with silanes, siloxanes, or a combination of silanes and siloxanes to improved adhesion and dispersion.

The amounts of any of the above fillers can be from 10 percent to 95 percent, from 20 percent to 90 percent, from 30 percent to 80 percent, or in some embodiments, less than, equal to, or greater than 10 percent, 15, 20, 25, 30, 35, 40, 45, 50, 55, 60, 65, 70, 75, 80, 85, 90, or 95 percent by weight relative to the overall weight of the curable composition. The aforementioned amounts may apply to a single filler or all fillers in totality.

As described herein curable composition can include glass microspheres an example of a glass microsphere are 3M Glass Microspheres from 3M Company or ECCOSPHERES brand hollow glass microspheres from Trelleborg AB, Trelleborg, Sweden. Such fillers can significantly reduce the density of a composition while preserving acceptable mechanical properties after curing. Advantageously, the inclusion of hollow filler particles can significantly reduce the density of the composition and hence the overall weight of the composition in practice. The density of the filler particles can be less than, equal to, or greater than 0.18 g/cm$^3$, 0.3, 0.5, 0.6, 0.8, 1.0, 1.2, 1.4, 1.6, 1.8, or 2 or more.

While not intended to be exhaustive, particular embodiments of these shimming methods are enumerated below:

1. A method for making a structural shim for installation between a first part and second part of an assembly, the method comprising: disposing a hardenable composition into a gap between the first and second parts; hardening the hardenable composition to provide a shim pattern that is dimensionally stable; removing the shim pattern from the gap, the shim pattern being capable of removal from the gap without damage; using the shim pattern to fabricate the structural shim.
2. The method of embodiment 1, wherein the assembly is an aircraft, the first part is a skin of the aircraft, and the second part is a substructure of the aircraft.
3. The method of embodiment 1 or 2, wherein using the shim pattern to fabricate the structural shim comprises creating a digital model of the shim pattern and then using the digital model to fabricate the structural shim.
4. The method of any one of embodiments 1-3, wherein removal of the shim pattern from the gap leaves behind essentially zero residual contamination on the skin or substructure.
5. The method of any one of embodiments 1-4, wherein the hardenable composition is an extrudable composition.
6. The method of any one of embodiments 1-5, wherein the hardenable composition is a liquid at ambient temperature.
7 The method of any one of embodiments 1-6, wherein the hardenable composition is dimensionally stable at ambient temperature.
8. The method of embodiment 7, wherein the hardenable composition is provided in a form of a film or sheet.
9. The method of any one of embodiments 1-8, wherein the hardenable composition is a curable composition and hardening the hardenable composition comprises curing the curable composition.
10. The method of embodiment 9, wherein the curable composition comprises first and second components, and wherein the curable composition is cured by mixing the first and second components with each other.
11. The method of embodiment 9, wherein the curable composition is cured by exposure to actinic radiation, and wherein the exposure to actinic radiation is provided by transmitting the actinic radiation through a plurality of films, fibers, and/or particles that are embedded in the curable composition.
12. The method of embodiment 9, wherein the curable composition is cured by heating the curable composition to a curing temperature above ambient temperature.
13. The method of any one of embodiments 1-12, wherein the structural shim is fabricated by an additive or subtractive manufacturing process.
14. A method joining a skin and substructure of an aircraft, the method comprising: making a structural shim according to the method of any one of embodiments 1-13; inserting the structural shim between the skin and substructure; and fastening the skin and substructure to each other.
15. A method for making a shim pattern for fabrication of a structural shim for installation between a skin and substructure of an aircraft, the method comprising: disposing a hardenable composition into a gap between the skin and the substructure; hardening the hardenable composition to provide the shim pattern, wherein the shim pattern is dimensionally stable; and removing the shim pattern from the gap, the shim pattern being capable of removal from the gap without damage.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

| Materials | | |
|---|---|---|
| Designation | Description | Source |
| CB | Carbon black available under the designation RAVEN 890 | Birla Carbon U.S.A. Marietta, GA. United States |

TABLE 1-continued

| Materials | | |
|---|---|---|
| Designation | Description | Source |
| DABCO | 1,4-diazabicyclo[2.2.2]octane | Alfa Aesar Ward Hill, MA. United States |
| DAEBPA | Diallyl ether of bisphenol A | Bimax Glen Rock, PA. United States |
| D-E135 | Expanding polymeric microsphere available under the designation DUALITE E135-040D | Chase Corporation Westwood, MA. United States |
| HT | Hydrogenated terphenyl plasticizer available under the designation HB-40 | Eastman Chemical Co. Kingsport, TN. United States |
| $MnO_2$ | Manganese oxide, type 2 | Shepherd Color Co. Cincinnati, OH. United States |
| OR819 | Phenylbis(2,4,6-trimethylbenzoyl)phosphine oxide available under the designation OMNIRAD 819 | IGM Resins St. Charles, IL. United States |
| PCNB | 11S695 PCN blue plasticizer paste | Penn Color Doylestown, PA. United States |
| PS | Liquid polysulfide polymer available under the trade designation THIOPLAST G 4 | AkzoNobel, N.V. Amsterdam, Netherlands |
| PTE | Thiol-terminated polythioether oligomer with the equivalent weight of 1482 g/mol synthesized as described in "Polythioether Example 1" in PCT Publ. No. WO 2016/130673 | 3M Company St. Paul, MN. United States |
| R202 | Fumed silica available under the designation AEROSIL R202 | Evonik Industries, AG Essen, Germany |
| RB | Rhodamine B | TCI America Portland, OR. United States |
| S322 | Coated calcium carbonate available under the designation SOCAL 322 | Solvay Chemicals Houston, TX. United States |
| TAIC | Triallyl isocyanurate | TCI America Portland, OR. United States |
| TBEC | tert-Butylperoxy 2-ethylhexyl carbonate | Sigma-Aldrich Corporation St. Louis, MO. United States |
| TETD | Tetramethyl/ethyl thiuram disulfide accelerator available under the designation PERKACIT TETD | Flexsys America LP. Akron, OH. United States |
| $TiO_2$ | Titanium dioxide available under the designation Ti-PURE 890 | E. I. du Pont de Nemours and Company Wilmington, DE. United States |
| TnBB-MOPA | Tri-n-butylborane methoxypropylamine | BASF SE Ludwigshafen, Germany |
| ZnSt | Zinc stearate | PMC Biogenix Inc. Memphis, TN. United States |

Test Methods

Viscosity

The viscosity of a sample was measured in accordance with the method described in ASTM D2196-10. The sample was stabilized at 77° F. (25° C.) for a minimum of eight hours prior to measurement. The sample was stirred by hand for three minutes, allowed to stand undisturbed for 60 minutes, and the viscosity was determined using a DV2T rotational viscometer equipped with a number 7 spindle rotating at two revolutions per minute (RPM) obtained from AMETEK Brookfield of Middleboro, MA United States.

Density

Density of a sample was measured in accordance with the method described in ASTM D792-13. The sample was stabilized at 77° F. (25° C.) for a minimum of 24 hours prior to measurement. The weights of the sample in air and water were measured using a XS104 Analytical Balance equipped with a density kit obtained from Mettler Toledo of Columbus, OH United States.

Hardness Measurement

Samples were made by applying sealant to an open-faced, polytetrafluoroethylene (PTFE) mold having cavity dimensions of 9.525 cm×4.064 cm×0.318 cm (3.75 in×1.6 in×0.125 in). Excess sealant was scraped off using a flat-bladed tool such that the top and bottom surfaces of the applied sealant were approximately parallel.

The instantaneous hardness was determined in accordance with ASTM D2240 using a Model 2000 Type A Durometer obtained from Rex Gauge Company of Buffalo Grove, IL United States after the sample was allowed to cure under the given conditions. The reading was taken on two 0.318 cm (0.125 in) thick specimens, stacked back to back (for a "Top Hardness" measurement) or front to front (for a "Bottom Hardness"). If the thickness was less than 0.318 cm (0.125 in), then multiple pieces were stacked to obtain a total thickness of at least 0.635 cm (0.25 in).

Example 1

Step 1: Part A Preparation of Polysulfide Pattern Compound

Part A was prepared by mixing the weight percentages of $MnO_2$ and MT identified in Table 1 in a MAX 200 DAC cup (FlackTek, Inc. of Landrum, SC United States) using a spatula. The contents of the cup were then mixed for 60 seconds at 1600 revolutions per minute (RPM) using a SPEEDMIXER model DAC 400 FVZ (FlackTek, Inc.). The sides and bottom of the cup were scraped with a spatula and the contents of the cup mixed for an additional 30 seconds at 1600 RPM. ZnSt and CB were then added in weight percentages identified in Table 1 to the DAC cup and all the ingredients were mixed for 60 additional seconds at 1600 RPM. The resultant curing agent component had a viscosity of 1350 poise at 25° C. (77° F.) and a density of 1.58 g/cm$^3$.

TABLE 1

| Part A Components | |
|---|---|
| Component | Weight Percent |
| HT | 49.0 |
| $MnO_2$ | 49.0 |
| CB | 1.0 |
| ZnSt | 1.0 |

Step 2: Part B Preparation of Polysulfide Pattern Compound

Part B was prepared in a similar manner as Part A. Weight percentages of PS, S322, TiO2, HT, RB, and TETD identified in Table 2 were mixed in a MAX 200 DAC cup using a spatula. The contents of the cup were then mixed for 60 seconds at 1600 RPM using a DAC 400 FVZ SPEEDMIXER. The sides and bottom of the cup were scraped with a spatula and the contents mixed for an additional 30 seconds at 1600 RPM. The resultant base component had a viscosity of 11,200 poise at 25° C. (77° F.), a density of 1.51 g/cm$^3$ and was red in color.

TABLE 2

| Part B Components | |
|---|---|
| Component | Weight Percent |
| PS | 60.0 |
| S322 | 30.0 |
| $TiO_2$ | 5.0 |
| HT | 4.4 |
| RB | 0.5 |
| TETD | 0.1 |

Step 3: Mixing of the Polysulfide Pattern Compound 10 grams of Part A was mixed with 100 grams of Part B in a MAX 200 DAC cup using a spatula. The contents of the cup were then mixed for 60 seconds at 1600 RPM using a DAC 400 FVZ SPEEDMIXER. The sides and bottom of the cup were scraped with a spatula and the contents mixed for an additional 30 seconds at 1600 RPM.

Step 4: Testing of the Polysulfide Pattern Compound

A 25-gram portion of the mixed composition was placed into a shim gap between two mating parts of an aircraft structure. The resultant rubbery gap pattern had a Shore A hardness of 55, exhibited no adhesion to the aircraft parts and provided a nominal map of the outlines and profiles of the required shim.

Example 2

Step 1: Preparation of the Curing Agent (Part A)

Part A was prepared by mixing the weight percentages of PET and DABCO identified in Table 3 in a MAX 200 DAC cup using a spatula and heating at 60° C. for two hours. The mixture was cooled to room temperature and weight percentages identified in Table 3 of the remaining ingredients: R-202, S322, D-E135 and TnBB-MOPA were added to the DAC cup. The ingredients were then mixed for 60 seconds at 1600 RPM using a DAC 400 FVZ SPEEDMIXER. The sides and bottom of the cup were scraped with a spatula and the ingredients mixed for an additional 30 seconds at 1600 RPM.

TABLE 3

| Part A Components | |
|---|---|
| Component | Weight Percent |
| PTE | 73.58 |
| DABCO | 0.01 |
| R202 | 0.37 |
| S322 | 24.28 |
| D-E135 | 1.21 |
| TnBB-MOPA | 0.55 |

Step 2: Preparation of the Base (Part B)

Part B was prepared by mixing the ingredients identified in Table 4 in a MAX 200 DAC cup for 60 seconds at 1600 RPM with a DAC 400FVZ SPEEDMIXER. The sides and bottom of the cup were scraped with a spatula and the contents mixed for an additional 30 seconds at 1600 RPM.

TABLE 4

| Part B Components | |
|---|---|
| Component | Weight Percent |
| DAEBPA | 61.90 |
| TAIC | 3.95 |
| TBEC | 11.73 |
| OR819 | 4.94 |
| R202 | 10.46 |
| PCNB | 0.05 |
| D-E135 | 6.97 |

Step 3: Mixing of the Curing Agent (Part A) and Base (Part B)

90.92 grams of Part A was mixed with 10.34 grams of Part B in a MAX 200 DAC cup using a spatula. The cup was then mixed for 30 seconds at 1600 RPM using a DAC 400 FVZ SPEEDMIXER. The sides and bottom of the cup were scraped with a spatula and the cup was speed mixed for an additional 30 seconds at 1600 RPM.

Step 4: Testing of the Pattern Compound

A 25-gram portion of the mixed composition was placed into a shim gap between two mating parts of an automobile door structure. The exposed portions of the pattern compound were irradiated for 60 seconds using a 450 nm LED curing lamp (3M ELIPAR DeepCure-S Light, 3M Company, St. Paul, MN United States). Over the next eight hours, the remaining non-irradiated portions of the pattern compound fully cured to a rubbery mass. The resulting gap pattern exhibited no adhesion to the automobile door parts, had a Shore A hardness of 45, and provided a nominal map of the outlines and profiles of the required shim.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method for making a structural shim for installation between a first part and second part of an assembly, the method comprising:

disposing a hardenable composition into a gap between the first and second parts, wherein the hardenable composition is a liquid at ambient temperature;

hardening the hardenable composition to provide a shim pattern that is dimensionally stable;

removing the shim pattern from the gap, the shim pattern being capable of removal from the gap without damage; and using the shim pattern to fabricate the structural shim, wherein the hardenable composition is a curable composition and hardening the hardenable composition comprises curing the curable composition, wherein the curable composition is cured by exposure to actinic radiation, and wherein the exposure to actinic radiation is provided by transmitting the actinic radiation through a plurality of films, fibers, and/or particles that are embedded in the curable composition.

2. The method of claim 1, wherein the assembly is an aircraft, the first part is a skin of the aircraft, and the second part is a substructure of the aircraft.

3. The method of claim 1, wherein using the shim pattern to fabricate the structural shim comprises creating a digital model of the shim pattern and then using the digital model to fabricate the structural shim.

4. The method of claim 1, wherein removal of the shim pattern from the gap leaves behind zero residual contamination on the skin or substructure.

5. The method of claim 1, wherein the hardenable composition is an extrudable composition.

6. The method of claim 1, wherein the curable composition comprises first and second components, and wherein the curable composition is cured by mixing the first and second components with each other.

7. The method of claim 1, wherein the curable composition is cured by heating the curable composition to a curing temperature above ambient temperature.

8. The method of claim 1, wherein the structural shim is fabricated by an additive or subtractive manufacturing process.

9. A method joining a skin and substructure of an aircraft, the method comprising:

making a structural shim according to the method of claim 1;

inserting the structural shim between the skin and substructure; and fastening the skin and substructure to each other.

10. A method for making a structural shim for installation between a first part and second part of an assembly, the method comprising:

disposing a hardenable composition into a gap between the first and second parts, wherein the hardenable composition is dimensionally stable at ambient temperature and provided in the form of a film or sheet;

hardening the hardenable composition to provide a shim pattern that is dimensionally stable;

removing the shim pattern from the gap, the shim pattern being capable of removal from the gap without damage; and using the shim pattern to fabricate the structural shim.

* * * * *